US011908433B2

(12) United States Patent
Pyun et al.

(10) Patent No.: US 11,908,433 B2
(45) Date of Patent: Feb. 20, 2024

(54) DISPLAY DEVICE AND DRIVING METHOD THEREOF

(71) Applicant: SAMSUNG DISPLAY CO., LTD., Yongin-si (KR)

(72) Inventors: Ki Hyun Pyun, Yongin-si (KR); Jang Mi Lee, Yongin-si (KR); Eun Jin Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/134,431

(22) Filed: Apr. 13, 2023

(65) Prior Publication Data

US 2023/0252955 A1 Aug. 10, 2023

Related U.S. Application Data

(63) Continuation of application No. 17/345,432, filed on Jun. 11, 2021, now Pat. No. 11,657,780.

(30) Foreign Application Priority Data

Oct. 16, 2020 (KR) ........................ 10-2020-0134593

(51) Int. Cl.
*G09G 5/10* (2006.01)
*G09G 3/20* (2006.01)

(52) U.S. Cl.
CPC ................. *G09G 5/10* (2013.01); *G09G 3/20* (2013.01); *G09G 2320/0271* (2013.01); *G09G 2320/0646* (2013.01)

(58) Field of Classification Search
CPC .... G09G 5/10; G09G 3/20; G09G 2320/0271; G09G 2320/0646
See application file for complete search history.

(56) References Cited

U.S. PATENT DOCUMENTS

2009/0279322 A1 11/2009 Kim et al.
2012/0038684 A1* 2/2012 Ryu ......................... G09G 3/20 345/690

(Continued)

FOREIGN PATENT DOCUMENTS

KR 101147098 B1 5/2012
KR 101460152 B1 11/2014

(Continued)

*Primary Examiner* — Amare Mengistu
*Assistant Examiner* — Jennifer L Zubajlo
(74) *Attorney, Agent, or Firm* — CANTOR COLBURN LLP

(57) ABSTRACT

A display device includes: a pixel part partitioned into blocks; a scale factor provider which calculates a first load value of input image data for the pixel part, calculates a second load value of the input image data for each block, and generates a scale factor based on the first and second load values; and a timing controller which generates image data by scaling gray values of the input image data based on the scale factor. The scale factor provider generates a first scale factor for commonly controlling the gray values for the blocks based on the first load value, when the first load value is greater than or equal to a reference load value, and generates a second scale factor for controlling gray value for each block based on the first and second load values, when the first load value is less than the reference load value.

16 Claims, 9 Drawing Sheets

(56) References Cited

U.S. PATENT DOCUMENTS

| | | | | |
|---|---|---|---|---|
| 2014/0118228 A1* | 5/2014 | Kang | G09G 3/3233 | 345/77 |
| 2014/0152643 A1* | 6/2014 | Kim | G09G 3/3258 | 345/82 |
| 2014/0354698 A1* | 12/2014 | Lee | G09G 3/3258 | 345/690 |
| 2014/0354699 A1* | 12/2014 | Shin | G09G 3/2022 | 345/690 |
| 2015/0255019 A1* | 9/2015 | Park | G09G 3/3225 | 345/208 |
| 2015/0310808 A1* | 10/2015 | Lee | G09G 3/2007 | 345/77 |
| 2016/0125811 A1* | 5/2016 | Park | G09G 3/3258 | 345/694 |
| 2016/0247437 A1* | 8/2016 | Choi | G09G 3/2003 | |
| 2017/0148385 A1* | 5/2017 | Kishi | G09G 3/3233 | |
| 2018/0033374 A1* | 2/2018 | Jeong | G09G 3/2088 | |
| 2018/0174527 A1* | 6/2018 | Botzas | G09G 3/2003 | |
| 2018/0190218 A1* | 7/2018 | Jang | G09G 3/2096 | |
| 2018/0226028 A1* | 8/2018 | Park | G09G 3/3275 | |
| 2018/0247591 A1* | 8/2018 | Kim | G09G 3/3233 | |
| 2019/0081471 A1* | 3/2019 | Park | H02H 3/08 | |
| 2019/0172387 A1* | 6/2019 | Choi | G09G 3/22 | |
| 2019/0189077 A1* | 6/2019 | Zhao | H01L 27/124 | |
| 2019/0213958 A1* | 7/2019 | Cho | G09G 3/3266 | |
| 2020/0357344 A1* | 11/2020 | Pyun | G09G 3/3233 | |
| 2021/0012704 A1* | 1/2021 | Pyun | G09G 3/32 | |
| 2021/0295767 A1* | 9/2021 | Seo | G09G 3/2003 | |
| 2021/0295789 A1* | 9/2021 | Kang | G09G 3/3607 | |
| 2021/0390898 A1* | 12/2021 | Roh | G09G 3/2003 | |
| 2021/0407364 A1* | 12/2021 | Seo | G09G 3/3233 | |
| 2022/0084471 A1* | 3/2022 | Pyun | G09G 3/3233 | |
| 2022/0108650 A1* | 4/2022 | Park | G09G 3/32 | |
| 2022/0157224 A1* | 5/2022 | Pyun | G09G 3/2007 | |
| 2022/0157231 A1* | 5/2022 | Chaji | G09G 3/14 | |
| 2022/0157232 A1* | 5/2022 | Pyun | G09G 3/32 | |
| 2022/0262307 A1* | 8/2022 | Pyun | G09G 3/3258 | |
| 2022/0277687 A1* | 9/2022 | Pyun | G09G 3/32 | |
| 2022/0398988 A1* | 12/2022 | Xiao | G09G 3/3406 | |

FOREIGN PATENT DOCUMENTS

| | | | |
|---|---|---|---|
| KR | 101839327 | B1 | 3/2018 |
| KR | 101899399 | B1 | 9/2018 |
| KR | 1020200015292 | A | 2/2020 |
| KR | 102132223 | B1 | 7/2020 |

* cited by examiner

RBLK: BLK24
FL: 10%

DISPLAY DEVICE AND DRIVING METHOD THEREOF

This application is a continuation of U.S. patent application Ser. No. 17/345,432, filed on Jun. 11, 2021, which claims priority to Korean Patent Application No. 10-2020-0134593, filed on Oct. 16, 2020, and all the benefits accruing therefrom under 35 U.S.C. § 119, the content of which in its entirety is herein incorporated by reference.

BACKGROUND

(a) Field

Embodiments of the invention relate to a display device and a driving method of the display device.

(b) Description of the Related Art

A display device may control luminance of a display panel in response to a load value of input data to minimize power consumption. Such a display device may control luminance of the display panel, for example, by calculating a load value of input data and controlling a current flowing through the display panel based on the calculated load value.

SUMMARY

In a display device, where luminance of a display panel thereof is controlled in response to a load value of input data, the load value may be different for each display area depending on an image displayed by the display panel. In this case, a user's gaze may be concentrated on an area with a large load value among the display areas. In such a display device, when the display device entirely controls the luminance of the display panel, image quality of a display image may be deteriorated due to different load values for each display area.

Embodiments of the invention relate to a display device in which quality characteristics of a display image is improved by commonly controlling luminance of a display panel to minimize power consumption when a full load value of a display panel is greater than a reference value, and by differently controlling the luminance of the display panel for each display area based on the load value for each display area when the full load value of the display panel is less than the reference value.

According to an embodiment of the invention, a display device includes: a pixel part including a plurality of pixels, where the pixel part is partitioned into a plurality of blocks; a scale factor provider which calculates a first load value of input image data corresponding to all of the blocks, calculates a second load values of the input image data for each of the blocks, and generates a scale factor based on the first load value and the second load values; and a timing controller which generates image data by scaling gray values of the input image data based on the scale factor. In such an embodiment, the scale factor provider generates a first scale factor for commonly controlling the gray values of the input image data corresponding to the blocks as the scale factor based on the first load value, when the first load value is greater than or equal to a reference load value, and generates a second scale factor for controlling the gray values of the input image data for each block as the scale factor based on the first load value and the second load values, when the first load value is less than the reference load value.

In an embodiment, when the first load value is greater than or equal to the reference load value, as the first load value increases, a luminance of an image displayed in the pixel part may decrease based on the first scale factor; and when the first load value is less than the reference load value, as the first load value decreases, a luminance of an image displayed on each of the blocks may increase based on the second scale factor.

In an embodiment, when the first load value is less than the reference load value, an image having a highest luminance may be displayed in a reference block, which has a greatest second load value among the blocks.

In an embodiment, the scale factor provider may include: a load calculator which calculates the first load value to generate first load data, and calculates the second load values to generate second load data; a reference block extractor which generates reference block data by extracting a reference block having a greatest second load value among the blocks based on the second load data; a load comparator which generates third load data by comparing the second load value of the reference block and the second load value of a neighboring block based on the second load data and the reference block data; and a scale factor generator which generates the scale factor based on the first load data, the third load data, and the reference block data.

In an embodiment, the scale factor generator may generate the first scale factor based on the first load data when the first load value is equal to or greater than the reference load value based on the first load data.

In an embodiment, as the first load value increases, a size of the first scale factor may decrease.

In an embodiment, when the first load value is greater than or equal to the reference load value, the scale factor generator may generate an enable signal, and the reference block extractor and the load comparator may be turned off in response to the enable signal.

In an embodiment, when the first load value is less than the reference load value based on the first load data, the scale factor generator may generate the second scale factor based on the first load data, the third load data, and the reference block data.

In an embodiment, the scale factor generator may include: a first control value generator which generates a first control value based on the first load data; a second control value generator which generates a second control value based on the reference block data; a third control value generator which generates a third control value based on the third load data; and an output part which generates the second scale factor based on the first to third control values.

In an embodiment, the second scale factor may include a first sub-scale factor corresponding to the reference block and a second sub-scale factor corresponding to the neighboring block. In such an embodiment, the output part may generate the first sub-scale factor based on the first to third control values, and may generate the second sub-scale factor based on the first sub-scale factor, the reference block data, and the third load data.

In an embodiment, the first sub-scale factor may be greater than the second sub-scale factor.

In an embodiment, as the first load value decreases, the first control value may increase.

In an embodiment, as the reference block is farther away from a central portion of the pixel part, the second control value may decrease.

In an embodiment, as a difference in the second load value between the reference block and the neighboring block increases, the third control value may increase.

In an embodiment, as a difference in the second load value between the reference block and the neighboring block increases, a difference between the first sub-scale factor and the second sub-scale factor may increase.

According to an embodiment of the invention, a driving method of a display device, which includes a pixel part including a plurality of pixels and is partitioned into a plurality of blocks, includes: calculating a first load value of input image data corresponding to all of the blocks; calculating second load values of the input image data for each of the blocks; generating a scale factor based on the first load value and the second load values; generating image data by scaling gray values of the input image data by using the scale factor, and generating a data signal corresponding to the image data to supply the data signal to the pixels. In such an embodiment, the generating the scale factor includes generating a first scale factor which commonly controls the gray values of the input image data corresponding to the blocks as the scale factor based on the first load value, when the first load value is greater than or equal to a reference load value, and generating a second scale factor which controls the gray values of the input image data for each of the blocks as the scale factor based on the first load value and the second load values, when the first load value is less than the reference load value.

In an embodiment, when the first load value is greater than or equal to the reference load value, as the first load value increases, a luminance of an image displayed in the pixel part may decrease based on the first scale factor. In such an embodiment, when the first load value is less than the reference load value, as the first load value decreases, a luminance of images displayed on each of the blocks may increase based on the second scale factor, and an image having a highest luminance may be displayed in a reference block having a greatest second load value among the blocks.

In an embodiment, the generating the scale factor may include: extracting a reference block having a greatest second load value among the blocks; comparing the second load value of the reference block and the second load value of a neighboring block; and generating the scale factor based on the first load value, a position of the reference block on the pixel part, and a difference in the second load value of the reference block and the neighboring block.

In an embodiment, the second scale factor may include a first sub-scale factor corresponding to the reference block and a second sub-scale factor corresponding to the neighboring block.

In an embodiment, the first sub-scale factor may be greater than the second sub-scale factor.

According to embodiments of the invention, in a display device, when a full load value of a display panel is less than a reference load value, luminance for each block may be differently controlled based on the full load value, a position of a reference block on the display panel, and a difference in load values between the reference block and neighboring blocks, such that an image quality characteristic of a display image may be improved.

In such embodiments, when a full load value of a display panel is greater than or equal to a reference load value, power consumption may be substantially reduced by commonly controlling luminance of blocks of the display panel.

DETAILED DESCRIPTION

Figure 1:
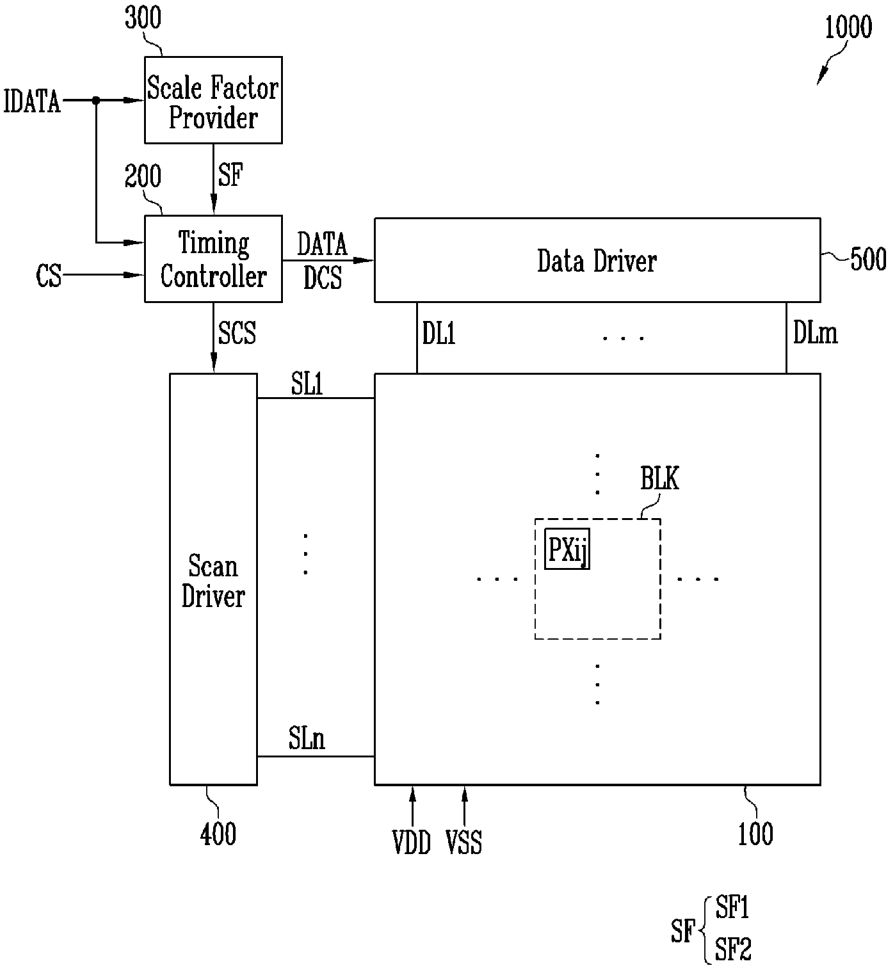
FIG. 1 illustrates a block diagram of a display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In addition, when it is described that an element is "coupled or connected" to another element, the element may be "directly coupled or connected" to the other element or "electrically coupled or connected" to the other element through a third element.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 illustrates a block diagram of a display device according to embodiments of the invention.

Referring to FIG. 1, an embodiment of a display device 1000 may include a display panel 100, a timing controller 200, a scale factor provider 300, a scan driver 400, and a data driver 500.

The display panel 100 (or, a pixel part) may include pixels connected to scan lines SL1 to SLn and data lines DL1 to DLm. Each pixel PXij may be connected to a corresponding data line Dj among the data lines DL1 to DLm and a corresponding scan line SLi among the scan lines SL1 to SLn. Here, n and m are integers greater than zero, and i and j are integers greater than zero and less than or equal to n and m, respectively. The pixel PXij may mean a pixel in which a scan transistor is connected to an i-th scan line SLi and a j-th data line DLj. In an embodiment, each pixel PXij may receive voltages of a first power source VDD and a second power source VSS from the outside. In such an embodiment, the first power source VDD and the second power source VSS may be voltages used for operations of the pixels. The first power source VDD may have a voltage level higher than that of the second power source VSS. In one embodiment, for example, a voltage of the first power source VDD may be a positive voltage, and a voltage of the second power source VSS may be a negative voltage.

The display panel 100 may be partitioned or divided into a plurality of blocks BLK. Each block BLK may include at least one pixel PXij. Each of the blocks BLK may include a same number of pixels PXij. However, the invention is not limited thereto, and alternatively, the number of the pixels in the blocks BLK may be different from each other.

The timing controller 200 may receive input image data IDATA and a control signal CS from an outside. In an embodiment, the control signal CS may include a synchronization signal and a clock signal. In such an embodiment, the input image data IDATA may include at least one image frame.

The timing controller 200 may generate a first control signal SCS (or a scan control signal) and a second control signal DCS (or a data control signal) based on the control signal CS. The timing controller 200 may supply the first control signal SCS to the scan driver 400, and may supply the second control signal DCS to the data driver 500.

The first control signal SCS may include a scan start signal, a clock signal, and the like. The scan start signal may be a signal for controlling a start timing of a scan signal. The clock signal included in the first control signal SCS may be used to shift the scan start signal.

The second control signal DCS may include a source start signal and a clock signal. The source start signal may control a sampling starting point of data. The clock signal included in the second control signal DCS may be used to control a sampling operation.

In an embodiment, the timing controller 200 may scale gray values of the input image data IDATA by using a scale factor SF received from the scale factor provider 300. Luminance of an image displayed on the display panel 100 may be controlled based on the input image data IDATA of which gray values are scaled. In one embodiment, for example, the luminance of the image displayed on the display panel 100 may be controlled to be equal to or less than the maximum luminance (for example, 1000 nit) of the display panel 100.

The timing controller 200 may rearrange the input image data IDATA of which gray values are scaled to generate digital image data DATA, and may provide the digital image data DATA to the data driver 500.

The scale factor provider 300 may calculate a load value corresponding to each image frame of the input image data IDATA. In such an embodiment, the load value may correspond to gray values of the image frame. In one embodiment, for example, as a sum of gray values of the image frame increases, the load value of the corresponding image frame may increase.

In one embodiment, for example, the load value may be 100 in a full-white image frame, and the load value may be 0 in a full-black image frame. In such an embodiment, the full-white image frame may mean an image frame in which the entire pixels of the display panel 100 are set to maximum grays (white grays) to emit light with maximum luminance. In such an embodiment, the full-black image frame may mean an image frame in which the entire pixels of the display panel 100 are set to minimum grays (black grays) to not emit light. In such an embodiment, the load value may have a value between 0 and 100.

In an embodiment, the scale factor provider 300 may calculate a load value (or a second load value) for each block BLK on the display panel 100.

In an embodiment, the scale factor provider 300 may compare the full load value (or first load value) of the display panel 100 with a reference load value to generate the scale factor SF for controlling luminance of each of the blocks BLK.

In one embodiment, for example, when the full load value of the display panel 100 is greater than or equal to the reference load value, the scale factor provider 300 may generate a scale factor SF1 for controlling luminance of the entire display panel 100 to gradually decrease from reference luminance as the full load value of the display panel 100 increases In this case, the first scale factor SF1 may be commonly applied to all of the blocks BLK (or all of the pixels) of the display panel 100. That is, the gray values of the input image data IDATA may be scaled by a same ratio based on the first scale factor SF1.

In such an embodiment, when the full load value of the display panel 100 is less than the reference load value, the scale factor provider 300 may generate a second factor SF2 for controlling luminance at a different ratio for each block BLK based on the load value of each of the blocks BLK. In this case, the second scale factor SF2 may be differently applied to each of the blocks BLK. In one embodiment, for example, the second scale factor SF2 may include sub-scale factors corresponding to respective blocks BLK. That is, the gray values of the input image data IDATA may be scaled with different ratios based on the second scale factor SF1.

In one embodiment, for example, the scale factor provider 300 may generate the scale factor SF2, to extract a reference block with the greatest load value among the entire blocks BLK and to control the reference block to emit light with the greatest luminance among the blocks BLK. In this case, based on the second scale factor SF2, blocks excluding the reference block among the blocks BLK may be controlled in a way such that luminance of the blocks excluding the reference block decreases as they move away from the reference block. That is, as a distance from the reference block increases, a value of the corresponding second scale factor SF2 may decrease.

In such an embodiment, as described above, the scale factor provider 300 may minimize power consumption by commonly controlling the luminance of the display panel 100 when the full load value of the display panel 100 is relatively large. In such an embodiment, when the full load value is relatively small, the scale factor provider 300 may improve an image quality characteristic of the display image by differently controlling the luminance for each block BLK based on the load value of each of the blocks BLK.

The scan driver 400 may receive the first control signal SCS from the timing controller 200, and may supply scan signals to the scan lines SL1 to SLn in response to the first control signal SCS. In one embodiment, for example, the scan driver 400 may sequentially supply the scan signals to the scan lines SL1 to SLn. When the scan signals are sequentially supplied, the pixels PXij may be selected in horizontal line units (or pixel row units), and data signals may be supplied to the selected pixels PXij. In such an embodiment, the scan signal may be set to a gate-on voltage (low voltage or high voltage) so that a transistor (for example, scan transistor) that is included in each of the pixels PXij and receives the scan signal may be turned on.

The data driver 500 may receive image data DATA and the second control signal DCS from the timing controller 200, convert the digital image data DATA into an analog data signal (data voltage) in response to the second control signal DCS, and then supply the analog data signal to the data lines DL1 to DLm. The data signals supplied to the data lines DL1 to DLm may be supplied to the pixels PXij selected by the scan signals. For this purpose, the data driver 500 may supply the data signals to the data lines DL1 to DLm to be synchronized with the scan signal.

In such an embodiment, since the image data DATA is generated based on the input image data IDATA of which gray values are scaled by the scale factor SF, the data driver 500 may supply data signals corresponding to the scaled gray values to the data lines DL1 to DLm. In one embodiment, for example, the data driver 500 may apply the data signal corresponding to the scaled gray value of the pixel PXij to a j-th data line.

Figure 2:
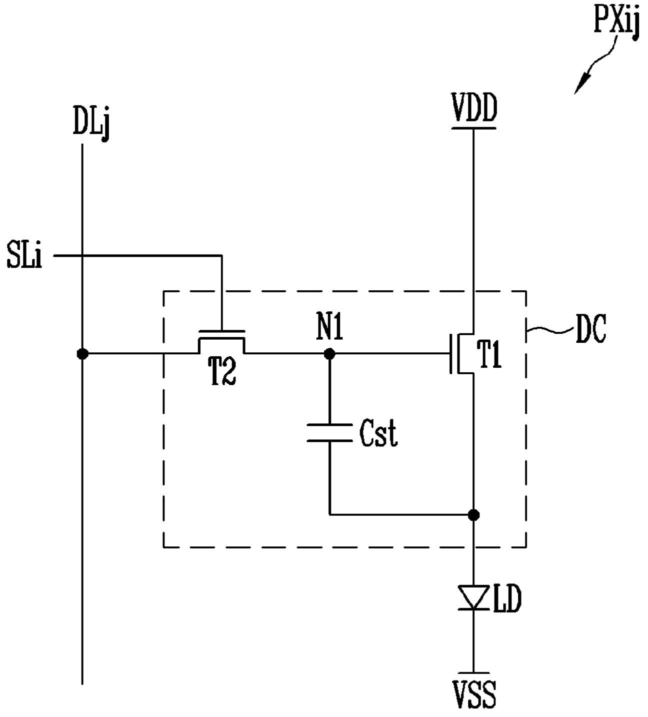
FIG. 2 illustrates a circuit diagram of an embodiment of a pixel included in the display device of FIG. 1.

FIG. 2 illustrates a circuit diagram of an embodiment of a pixel included in the display device of FIG. 1.

Referring to FIG. 2, an embodiment of the pixel PXij may include a light emitting element LD, and a driving circuit DC connected to the light emitting element LD to drive the light emitting element LD.

A first electrode (for example, anode electrode) of the light emitting element LD may be connected to the first power source VDD via the driving circuit DC, and a second electrode (for example, cathode electrode) of the light emitting element LD may be connected to the second power source VSS. The light emitting element LD may emit light with luminance corresponding to an amount of driving current controlled by the driving circuit DC.

In an embodiment, the light emitting element LD may include an organic light emitting diode. In an alternative embodiment, the light emitting element LD may include an inorganic light emitting diode such as a micro light emitting diode ("LED") or a quantum dot LED. Alternatively, the light emitting element LD may be an element including a combination of organic and inorganic materials. In an embodiment, as shown in FIG. 2, the pixel PXij includes a single light emitting element LD, but not being limited thereto. In an alternative embodiment, the pixel PXij may include a plurality of light emitting elements, and the plurality of light emitting elements may be connected in series, in parallel, or in series and parallel to each other.

The first power source VDD and the second power source VSS may have different potentials from each other. In one embodiment, for example, a voltage applied through the first power source VDD may be greater than a voltage applied through the second power source VSS.

The driving circuit DC may include a first transistor T1, a second transistor T2, and a storage capacitor Cst.

A first electrode of the first transistor T1 (driving transistor) may be connected to the first power source VDD, and a second electrode thereof may be electrically connected to the first electrode (for example, anode electrode) of the light emitting element LD. A gate electrode of the first transistor T1 may be connected to a first node N1. The first transistor T1 may control an amount of driving current supplied to the light emitting element LD in response to a data signal supplied to the first node N1 through a data line DLj.

A first electrode of the second transistor T2 (switching transistor) may be connected to the data line DLj, and a second electrode thereof may be connected to the first node N1. A gate electrode of the second transistor T2 may be connected to a scan line SLi.

When a scan signal of a voltage (for example, gate on voltage) at which the second transistor T2 may be turned on is supplied from the scan line SLi, the second transistor T2 may be turned on to electrically connect the data line DLj to the first node N1. In this case, a data signal of a corresponding frame is supplied to the data line DLj, and accordingly, the data signal may be transmitted to the first node N1. A voltage corresponding to the data signal transmitted to the first node N1 may be stored in the storage capacitor Cst.

One electrode of the storage capacitor Cst may be connected to the first node N1, and the other electrode thereof may be connected to the first electrode of the light emitting element LD. The storage capacitor Cst may be charged with the voltage corresponding to the data signal supplied to the first node N1, and may maintain the charged voltage until a data signal of a next frame is supplied.

FIG. 2 shows an embodiment of a pixel PXij having a relatively simple structure for better understanding and ease of description, and the structure of the driving circuit DC may be variously changed. In one embodiment, for example, the driving circuit DC additionally include various additional transistors such as a compensation transistor for compensating a threshold voltage of the first transistor T1, an initialization transistor for initializing the first node N1, and/or a light emission control transistor for controlling a light emission time of the light emitting element LD, and other circuit elements such as a boosting capacitor for boosting the voltage of the first node N1.

In an embodiment, as shown in FIG. 2, the transistors included in the driving circuit DC, for example, the first and second transistors T1 and T2, may be N-type transistors, but the invention is not limited thereto. Alternatively, at least one selected from the first and second transistors T1 and T2 included in the driving circuit DC may be changed to a P-type transistor.

Figure 3:
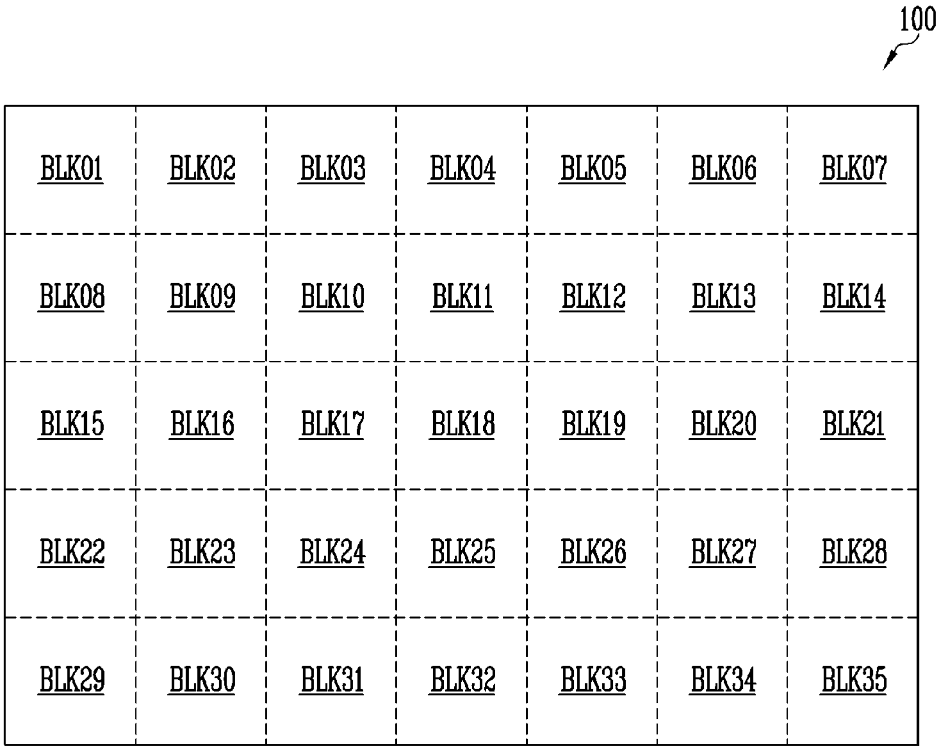
FIG. 3 illustrates an embodiment of a display panel included in the display device of FIG. 1.

FIG. 3 illustrates an embodiment of a display panel included in the display device of FIG. 1.

Referring to FIG. 3, an embodiment of the display panel 100 may include or be divided into a plurality of blocks BLK01 to BLK35. In such an embodiment, the pixels of the display panel 100 may be partitioned into the plurality of blocks BLK01 to BLK35. Each of the blocks BLK01 to BLK35 may include at least one pixel. The number of the blocks BLK01 to BLK35 may be equal to or smaller than the number of the pixels.

In an embodiment, the display panel 100 is partitioned into the blocks BLK01 to BLK35, each having a same size as each other, so that each of the blocks BLK01 to BLK35 may include a same number of pixels. However, this is exemplary, and the invention is not limited thereto. In one alternative embodiment, for example, all or some of the blocks BLK01 to BLK35 may share one or more pixels, or some of the blocks BLK01 to BLK35 may include more pixels than other blocks.

In an embodiment, as shown in FIG. 3, the display panel 100 may be partitioned into 35 blocks BLK01 to BLK35, but this is exemplary, and the invention is not limited thereto. In one embodiment, for example, the display panel 100 may be partitioned into various numbers of blocks according to the design of the display device (1000 in FIG. 1).

Figure 4:
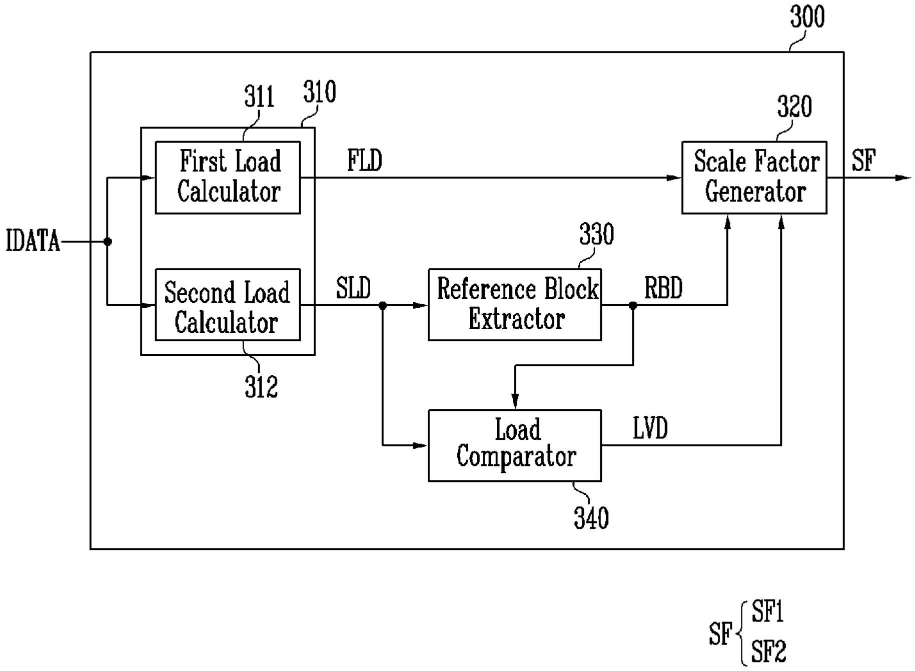
FIG. 4 illustrates a block diagram of a scale factor provider according to an embodiment of the invention.
Figure 5:
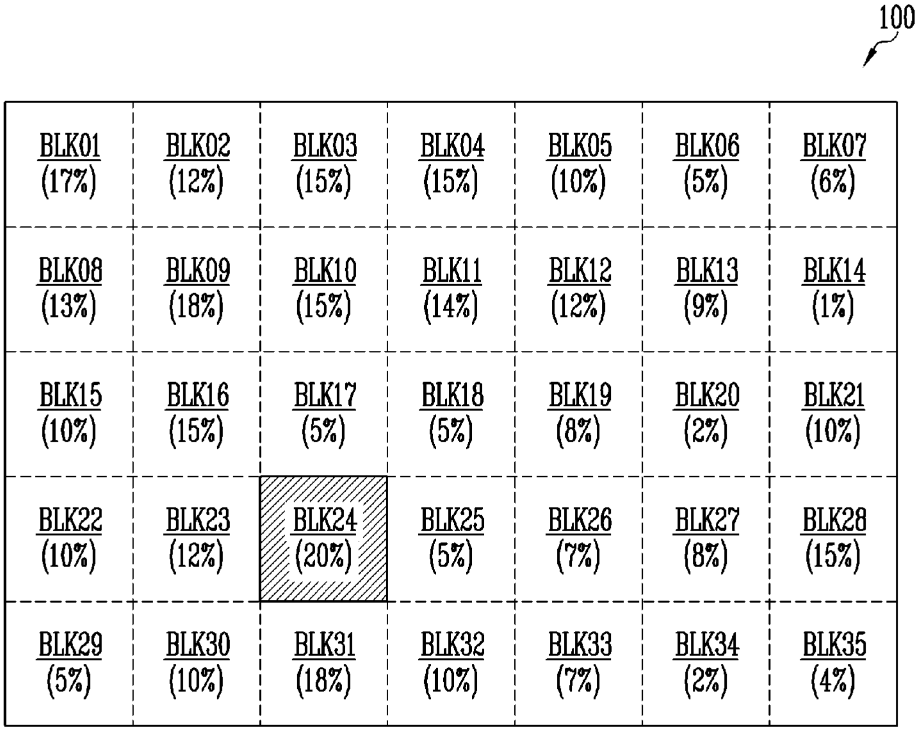
FIG. 5 illustrates an embodiment of load values of blocks included in the display panel of FIG. 3.
Figure 6:
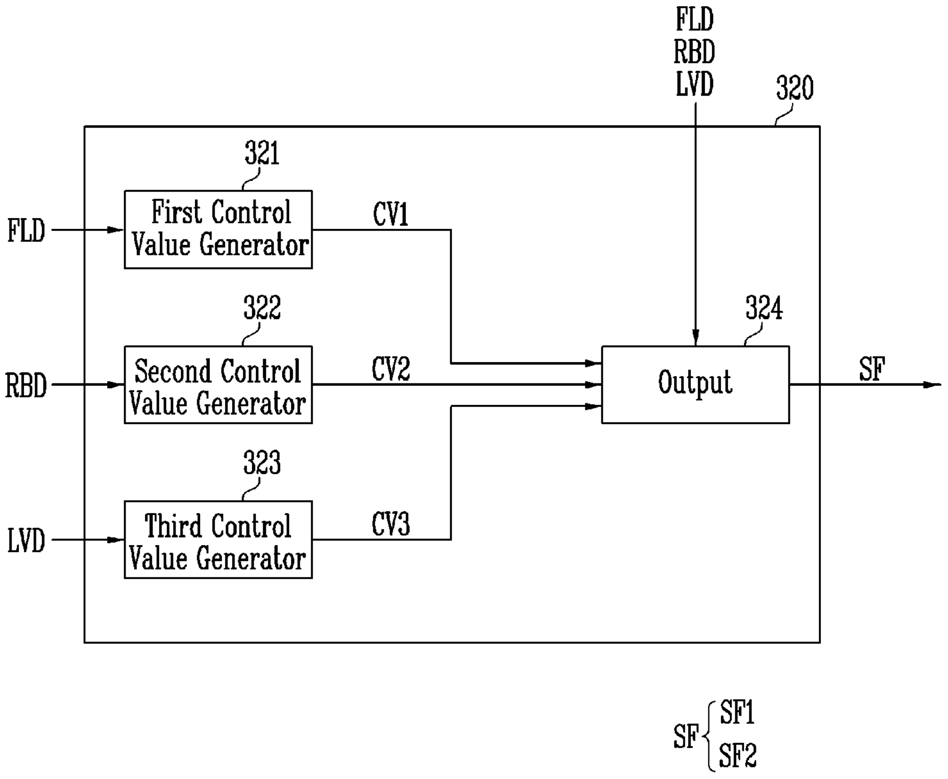
FIG. 6 illustrates a block diagram of an embodiment of a scale factor generator included in the scale factor provider of FIG. 4.
Figure 7A:
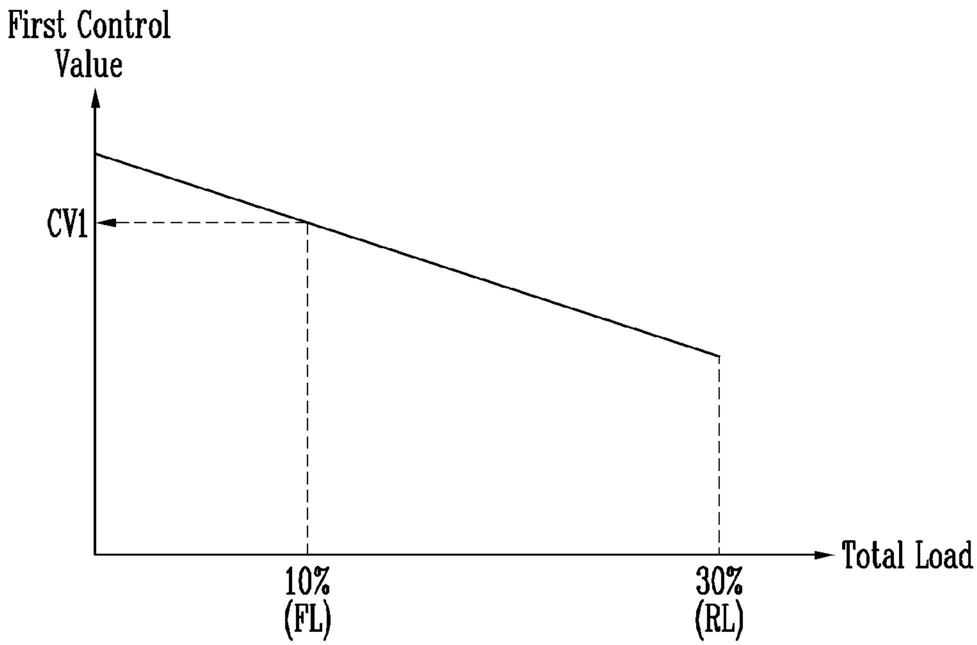
FIG. 7A to FIG. 7C are graphs for explaining an embodiment of an operation of the scale factor generator of FIG. 6.
Figure 7B:
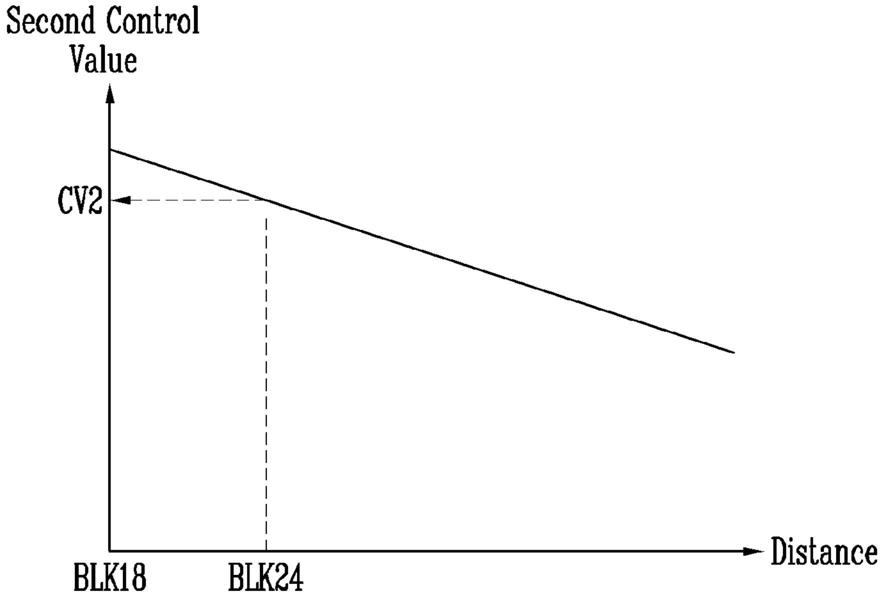
Figure 7C:
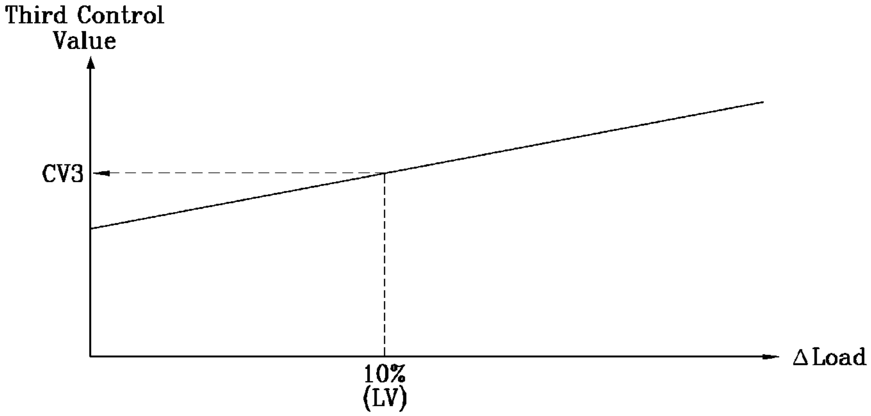
Figure 8A:
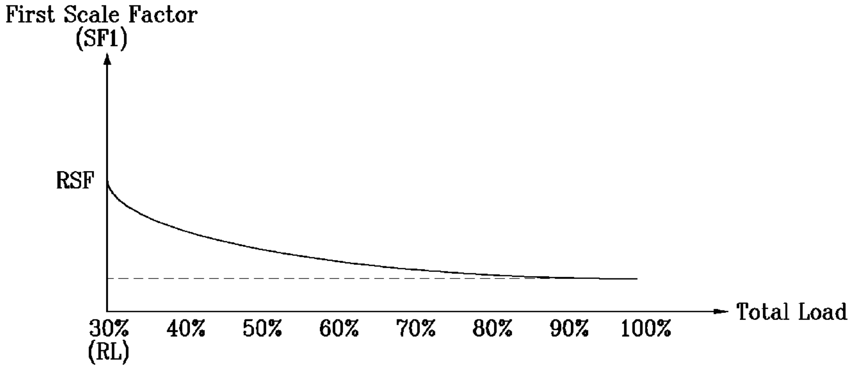
FIG. 8A and FIG. 8B are graphs of embodiments of a first scale factor and a second scale factor generated by the scale factor generator of FIG. 6.
Figure 8B:
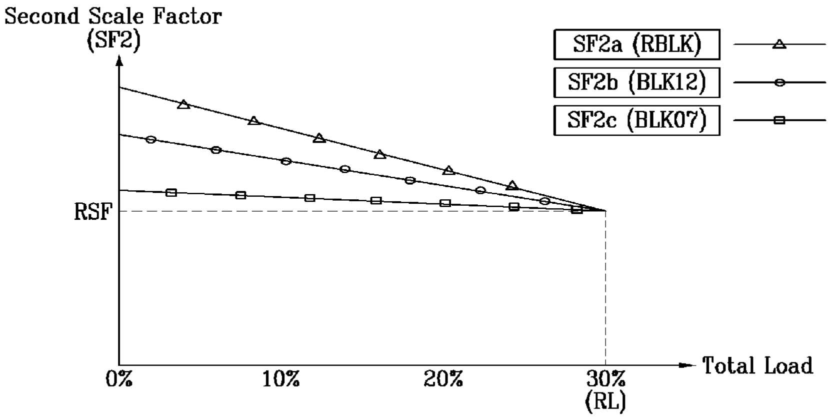

FIG. 4 illustrates a block diagram of a scale factor provider according to an embodiment of the invention, FIG. 5 illustrates an embodiment of load values of blocks included in the display panel of FIG. 3, FIG. 6 illustrates a block diagram of an embodiment of a scale factor generator included in the scale factor provider of FIG. 4, FIG. 7A to FIG. 7C are graphs for explaining an embodiment of an operation of the scale factor generator of FIG. 6, and FIG. 8A and FIG. 8B are graphs of embodiments of a first scale factor and a second scale factor generated by the scale factor generator of FIG. 6. In FIG. 8B, curved lines of three sub-scale factors SF2*a*, SF2*b*, and SF2*c*, which are the second scale factors SF2, are exemplarily illustrated.

Hereinafter, a case in which the first sub-scale factor SF2*a* is a sub-scale factor corresponding to the reference block RBLK; and as the second and third sub-scale factors SF2*b* and SF2*c*, which are sub-scale factors corresponding to neighboring blocks of the reference block RBLK, the third sub-scale factor SF2*c* is a sub-scale factor corresponding to the block BLK07 having the farthest distance from the reference block RBLK, and the second sub-scale factor SF2*b* is a sub-scale factor corresponding to the block BLK12 between the reference block RBLK and the block BLK07, will be mainly described.

Referring to FIG. 4 and FIG. 5, an embodiment of the scale factor provider 300 may include a load calculator 310, a scale factor generator 320, a reference block extractor 330, and a load comparator 340.

The load calculator 310 may calculate a load value based on the input image data IDATA. In an embodiment, the load calculator 310 may include a first load calculator 311 and a second load calculator 312.

The first load calculator 311 may generate first load data FLD by calculating a full load value FL (or first load value) of the display panel 100, and the second load calculator 312 may generate second load data SLD by calculating the load value (or second load value) for each of the blocks BLK01 to BLK35 of the display panel 100. In such an embodiment, the first load data FLD may include the full load value FL of the display panel 100, and the second load data SLD may include load values corresponding to each of the blocks BLK01 to BLK35.

The first load data FLD may be provided to the scale factor generator 320, and the second load data SLD may be provided to the reference block extractor 330 and the load comparator 340.

In FIG. 4, the first load calculator 311 and the second load calculator 312 are separately illustrated, but this is exemplary, and the first load calculator 311 and the second load calculator 312 may be integrated into a single unit or defined by portions of a single circuit.

The reference block extractor 330 may generate reference block data RBD by extracting the reference block RBLK having the greatest load value among all of the blocks BLK01 to BLK35 based on the second load data SLD received from the second load calculator 312. In one embodiment, for example, as shown in FIG. 5, the reference block extractor 330 may extract the block BLK24, which has the greatest load value of 20%, as the reference block RBLK.

The reference block data RBD may be provided to the scale factor generator 320 and the load comparator 340.

The load comparator 340 may generate third load data LVD by comparing load values between the reference block RBLK and neighboring blocks based on the reference block data RBD and the second load data SLD. In an embodiment, the third load data LVD may include a value corresponding to a difference in load values between the reference block RBLK and neighboring blocks.

In one embodiment, for example, the load comparator 340 may set the neighboring blocks as blocks BLK16, BLK17, BLK18, BLK23, BLK25, BLK30, BLK31, and BLK32 closest to the reference block RBLK.

However, the invention is not limited thereto, and the neighboring blocks may be variously set. In one alternative embodiment, for example, the load comparator 340 may set blocks BLK01 to BLK23 and BLK25 to BLK35 excluding the reference block RBLK as the neighboring blocks.

In an embodiment, the load comparator 340 may generate the third load data LVD based on a difference between an average value of load values of the neighboring blocks and the load value of the reference block RBLK. In one embodiment, for example, when the neighboring blocks are set as blocks BLK16, BLK17, BLK18, BLK23, BLK25, BLK30, BLK31, and BLK32), the third load data LVD may be generated based on a difference (that is, 10%) between 10%, which is an average value of the load values of the neighboring blocks and 20%, which is a load value of the reference block RBLK.

However, this is exemplary, and the invention is not limited thereto. In one alternative embodiment, for example, the load comparator 340 may generate the third load data LVD by comparing one of a maximum value, a minimum value, and an intermediate value of the load values of the neighboring blocks with the load value of the reference block RBLK.

The third load data LVD may be provided to the scale factor generator 320.

The scale factor generator 320 may generate the scale factor SF based on the first load data FLD, the third load data LVD, and the reference block data RBD.

Referring further to FIG. 6, an embodiment of the scale factor generator 320 includes a first control value generator 321, a second control value generator 322, a third control value generator 323, and an output part 324.

In an embodiment, the scale factor generator 320 may generate the first scale factor SF1 for controlling the entire luminance of the display panel 100 to gradually decrease from the reference luminance when the full load value FL is greater than or equal to the reference load value. In such an embodiment, the output part 324 of the scale factor generator 320 may generate the first scale factor SF1 as the scale factor SF based on the first load data FLD received from the first load calculator 311 when the full load value FL is greater than or equal to the reference load value. In this case, the first scale factor SF1 may be commonly applied to the blocks BLK01 to BLK35.

When there is no limit to a current supplied to the display panel 100, power consumption may be undesirably increased depending on the input image data (IDATA in FIG. 1). Accordingly, when the full load value FL of the input image data (I DATA in FIG. 1) is greater than or equal to the reference load value, the scale factor provider 300 may generate the first scale factor SF1 so that an amount of current flowing through the display panel 100 is limited to a certain level.

In an embodiment, the scale factor generator 320 may generate the first scale factor SF1 by Equation 1 below.

$$SF1\times(FL)^{P}=RL \quad \text{(Equation 1)}$$

Here, SF1 denotes the first scale factor SF1, FL denotes the full load value FL, and P denotes a load coefficient, representing a constant of 0 or greater and 1 or less. In Equation 1, RL denotes a reference load value, and corresponds to a constant that may be arbitrarily determined by a user. In one embodiment, for example, as shown in FIG. 8A, the reference load value RL may be 30%.

In Equation 1, since the first scale factor SF1 and a P-exponential squared value of the full load value FL are multiplied to become a reference load value corresponding to a constant, the first scale factor SF1 and the P-exponential squared value of the full load value FL are in inverse proportion to each other.

In one embodiment, for example, as shown in FIG. 8A, when the full load value FL is greater than or equal to the reference load value RL, the first scale factor SF1 may decrease as the full load value FL increases. Here, the first scale factor SF1 may have the greatest reference scale factor value RSF corresponding to the reference load value RL. In response to the first scale factor SF1 of the reference scale factor value RSF, the display panel 100 may emit light with reference luminance based on the input image data (IDATA in FIG. 1) of which gray values are scaled.

In such an embodiment, as described above, the greater the full load value FL, the less the first scale factor SF1 generated by the scale factor generator 320 may become. In such an embodiment, as described with reference to FIG. 1, luminance of an image displayed on the display panel 100 may be controlled based on the input data IDATA of which gray value is scaled by the first scale factor SF1. That is, since the luminance of the display image is controlled to be decreased as the full load value FL increases, the display device 1000 may minimize power consumption corresponding to a large load value. Such a technology is referred to as a net power control ("NPC") technology.

In an embodiment, when the full load value FL is less than the reference load value RL, the scale factor generator 320 may generate the second scale factor SF2 for controlling luminance at different ratios for respective blocks BLK01 to BLK35. Here, the second scale factor SF2 may be differently applied to each of the blocks BLK01 to BLK35. In one embodiment, for example, the second scale factor SF2 may include sub-scale factors, for example, the sub-scale factors (SF2*a*, SF2*b*, and SF2*c* shown in FIG. 8B) corresponding to each of the blocks BLK01 to BLK35.

In applying the aforementioned NPC technology, the luminance of the display image may be controlled relatively high in response to a low load value. In this case, when the gray values of the input image data IDATA are equally scaled such that the blocks BLK01 to BLK35 included in the display panel 100 emit light a same luminance, the image quality of the display image may be degraded due to different load values for each of the blocks BLK01 to BLK35. In one embodiment, for example, the user's gaze is typically focused on a block (for example, reference block RBLK) with a greatest load value, and in contrast, when the entire display panel 100 emits light with a same luminance regardless of the load values of the blocks BLK01 to BLK35, a contrast ratio is deteriorated within the display area, such that display quality may be deteriorated.

Accordingly, in an embodiment of the invention, when the full load value FL is less than the reference load value RL, the scale factor provider 300 (or the scale factor generator 320) may generate the second scale factor SF2 by differently controlling the luminance of the blocks BLK01 to BLK35 based on the load values of each of the blocks BLK01 to BLK35 to improve the quality characteristic of the display image. In such an embodiment, the second scale factor SF2 may be greater than or equal to the reference scale factor value RSF corresponding to the maximum value of the first scale factor SF1. Accordingly, in response to the input image data (IDATA in FIG. 1) of which gray values are scaled based on the second scale factor SF2, the display panel 100 may emit light with luminance equal to or greater than the reference luminance.

In such an embodiment, when the full load value FL is less than the reference load value, the output part 324 of the scale factor generator 320 may generate the first sub-scale factor SF2*a* corresponding to the reference block RBLK as the second scale factor SF2 based on the first load data FLD received from the first load calculator 311 by using first to third control values CV1, CV2, and CV3 provided from the first to third control value generators 321, 322, and 323. In one embodiment, for example, the output part 324 may generate the first sub-scale factor SF2*a* by multiplying the first to third control values CV1, CV2, and CV3.

The first control value generator 321 may generate the first control value CV1 based on the first load data FLD. The first control value CV1 is a gain value, and may have a value of 0 or greater and 1 or less.

The first control value generator 321 may generate, based on the first load data FLD, the first control value CV1 for controlling the luminance of the reference block RBLK to increase (that is, for controlling the first sub-scale factor SF2*a* to increase) as the full load value FL decreases. In one embodiment, for example, as shown in FIG. 7A, the first control value CV1 generated by the first control value generator 321 may have a greater value as the full load value FL decreases.

In an embodiment, as the full load value FL decreases, the power consumption is relatively low, so that the first control value generator 321 may further improve the contrast ratio by controlling the luminance of the reference block RBLK having the maximum load value to be greater than or equal to the reference luminance. Accordingly, the image quality characteristic of the display image may be improved.

The second control value generator 322 may generate the second control value CV1 based on the reference block data RBD. The second control value CV2 is a gain value, and may have a value of 0 or greater and 1 or less.

The second control value generator 322 may generate, based on the reference block data RBD, the second control value CV2 for controlling the luminance of the reference block RBLK to increase (that is, for controlling the first sub-scale factor SF2*a* to increase) as a position of the reference block RBLK is closer to a central portion of the display panel 100. In one embodiment, for example, as shown in FIG. 7B, based on a distance of the reference block RBLK (for example, the block BLK24 having the maximum load value shown in FIG. 5) from a block (for example, the block BLK18 positioned at the central portion shown in FIG. 5) corresponding to the central portion of the display panel 100, the second control value CV2 generated by the second control value generator 322 may have a greater value as a position of the reference block RBLK is closer to the central portion of the display panel 100.

Since the user's gaze is concentrated in the reference block RBLK having the maximum load value and the central portion of the display panel 100, the second control value generator 322 controls the luminance of the reference block RBLK to increase as the position of the reference block RBLK is closer to the central position of the display panel 100, thereby improving the quality characteristics of the display image.

The third control value generator 323 may generate the third control value CV3 based on the third load data LVD. The third control value CV3 is a gain value, and may have a value of 0 or greater and 1 or less.

The third control value generator 323 may generate, based on the third load data LVD, the third control value CV2 for controlling the luminance of the reference block RBLK to increase (that is, for controlling the first sub-scale factor SF2*a* to increase) as a difference in the load value (ΔLoad) between the reference block RBLK and the neighboring blocks increases. In one embodiment, for example, as shown in FIG. 7C, corresponding to the difference in the load value between the reference block RBLK and the neighboring blocks, the third control value CV3 generated by the third control value generator 323 may have a greater value as the difference in the load value increases.

As the difference in the load value between the neighboring blocks and the reference block RBLK increases, since the user's gaze may be further focused on the reference block RBLK, the third control value generator 323 controls the luminance of the reference block RBLK to further increase, thereby improving the image quality characteristic of the display image.

The output part 324 may generate the first sub-scale factor SF2*a* corresponding to the reference block RBLK based on the first to third control values CV1, CV2, and CV3, and may generate the sub-scale factors (for example, the second and third sub-scale factors SF2*b* and SF2*c*) corresponding to the remaining blocks excluding the reference block RBLK.

In an embodiment, the output part 324 may generate the sub-scale factors based on the reference block data RBD so that the luminance of the remaining blocks decreases as the distance from the reference block RBLK increases. In one embodiment, for example, the output part 324 may generate the sub-scale factors in a way such that the luminance of the remaining blocks linearly decreases as the distance from the reference block RBLK increases. In one embodiment, for example, the output part 324 may generate the sub-scale factors in a way such that the luminance of the remaining blocks non-linearly decreases as the distance from the reference block RBLK increases.

Accordingly, the second sub-scale factor SF2*b* corresponding to the block BLK12 may be less than the first sub-scale factor SF2*a* corresponding to the reference block RBLK, and the third sub-scale factor SF2*c* corresponding to the block BLK07 having the farthest distance from the reference block RBLK may be less than the second sub-scale factor SF2*b*. FIG. 8B illustrates an embodiment in which the subscale factors SF2*b* and SF2*c* corresponding to the neighboring blocks are greater than the reference scale factor value RSF, but this is exemplary, and alternatively, the position of the reference block RBLK on the display panel 100, the difference in load values between the reference block RBLK and the neighboring blocks, and the subscale factors SF2*b* and SF2*c* corresponding to the neighboring blocks according to the full load value FL may be the same as those of the reference scale factor value RSF.

In an embodiment, as the difference in the load value between the reference block RBLK and the neighboring blocks increases, the output part 324 may generate the sub-scale factors in a way such that the luminance of the remaining blocks decreases with a larger slope as the distance from the reference block RBLK increases. That is, as the difference in the load value between the reference block RBLK and the neighboring blocks increases, the output part 324 may control the difference between the first sub-scale factor SF2*a* corresponding to the reference block RBLK and the sub-scale factors SF2*b* and SF2*c* corresponding to the neighboring blocks to increase.

In an embodiment, as described with reference to FIG. 4 to FIG. 8B, when the full load value FL of the display panel 100 is greater than or equal to the reference load value RL, the scale factor provider 300 may generate the first scale factor SF1 for commonly controlling the luminance of the entire blocks BLK01 to BLK35 of the display panel 100

Accordingly, the power consumption thereof may be substantially reduced or minimized. In such an embodiment, when the full load value FL of the display panel 100 is less than the reference load value RL, the scale factor provider 300 may generate the second scale factor SF2 for differently controlling the luminance for each of the blocks BLK01 to BLK35, based on the full load value FL, the position of the reference block RBLK on the display panel 100, and the difference in load values of the reference block RBLK and of the neighboring blocks. Accordingly, an image quality characteristic of a display image may be improved.

Figure 9:
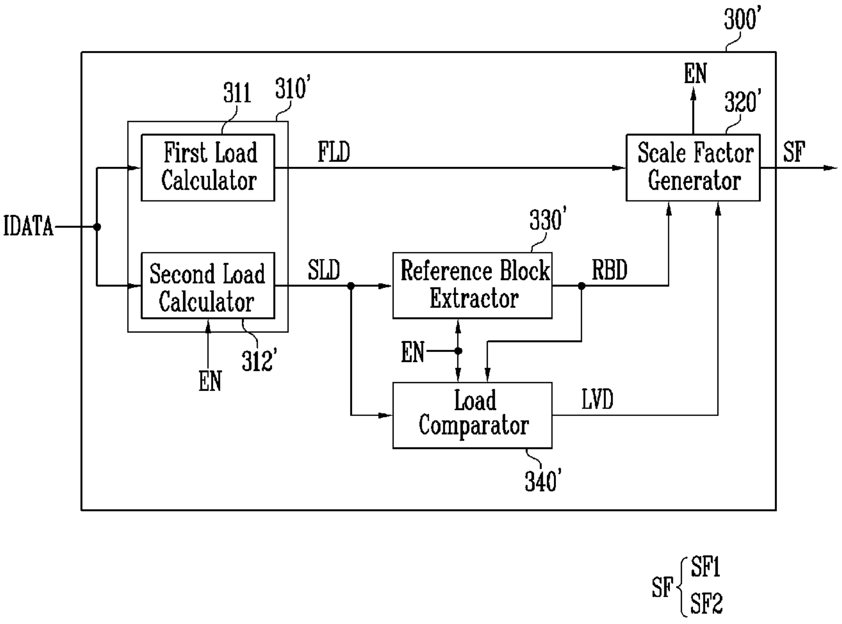
FIG. 9 illustrates a block diagram of a scale factor provider according to an alternative embodiment of the invention.

FIG. 9 illustrates a block diagram of a scale factor provider according to an alternative embodiment of the invention. The scale factor provider 300' of FIG. 9 is substantially the same as or similar to the scale factor provider 300 of FIG. 4, except for an operation thereof. The same or like elements shown in FIG. 9 have been labeled with the same or like reference characters as used above to describe the embodiment of the scale factor provider shown in FIG. 4, and any repetitive detailed description thereof will hereinafter be omitted or simplified.

Referring to FIG. 9, an embodiment of the scale factor provider 300' may include a load calculator 310', a scale factor generator 320', a reference block extractor 330', and a load comparator 340'.

In such an embodiment, when the full load value FL of the display panel 100 is greater than or equal to the reference load value, the scale factor generator 320' may generate, based on the first load data FLD provided from the first load calculator 311, an enable signal EN for turning off operations of the second load calculator 312', the reference block extractor 330', and the load comparator 340'.

When the full load value FL of the display panel 100 is greater than or equal to the reference load value, since the scale factor generator 320' generates the first scale factor SF1 as the scale factor SF based only on the first load data FLD, the load calculator 312', the reference block extractor 330', and the load comparator 340' are turned off in response the enable signal EN. Accordingly, the operation of the scale factor provider 300' is minimized, so that the power consumption of the scale factor provider 300' may be reduced.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a pixel part including a plurality of pixels, wherein the pixel part is partitioned into a plurality of blocks;

a scale factor provider which calculates a first load value of input image data corresponding to all of the blocks of the pixel part, calculates a second load value of the input image data for each of the blocks, and generates a scale factor based on the first load value and the second load value; and a timing controller which generates image data by scaling gray values of the input image data based on the scale factor, wherein when the first load value is less than a reference load value, a luminance of an image displayed in a reference block which has a greatest second load value among the blocks is higher than a luminance of an image displayed in a neighboring block.

2. The display device of claim 1, wherein as the first load value decreases, the scale factor generator controls the scale factor corresponding to the reference block to increase.

3. The display device of claim 1, wherein as the reference block is closer to a central portion of the pixel part, the scale factor generator controls the scale factor corresponding to the reference block to increase.

4. The display device of claim 1, wherein as a difference in the second load value between the reference block and the neighboring block increases, the scale factor generator controls the scale factor corresponding to the reference block to increase.

5. The display device of claim 1, wherein as a difference in the second load value between the reference block and the neighboring block increases, the scale factor generator controls the scale factor corresponding to the neighboring block to decrease.

6. The display device of claim 1, wherein as the neighboring block is farther away from the reference block, the scale factor generator controls the scale factor corresponding to the neighboring block to decrease.

7. The display device of claim 1, wherein when the first load value is greater than or equal to the reference load value, a luminance of an image displayed in the blocks decreases.

8. The display device of claim 7, wherein as the first load value increases, the scale factor generator controls the scale factor corresponding to the blocks to decrease.

9. A driving method of a display device which includes a pixel part including a plurality of pixels and is partitioned into a plurality of blocks, the driving method comprising:

calculating a first load value of input image data corresponding to all of the blocks of the pixel part;

calculating second load values of the input image data for each of the blocks;

generating a scale factor based on the first load value and the second load values;

generating image data by scaling gray values of the input image data by using the scale factor, and generating a data signal corresponding to the image data to supply the data signal to the pixels, wherein when the first load value is less than a reference load value, a luminance of an image displayed in a reference block which has a greatest second load value among the blocks is higher than a luminance of an image displayed in a neighboring block.

10. The driving method of the display device of claim 9, wherein the generating the scale factor includes:

controlling the scale factor corresponding to the reference block to increase as the first load value decreases.

11. The driving method of the display device of claim 9, wherein the generating the scale factor includes:

controlling the scale factor corresponding to the reference block to increase as the reference block is closer to a central portion of the pixel part.

12. The driving method of the display device of claim 9, wherein the generating the scale factor includes:

controlling the scale factor corresponding to the reference block to increase as a difference in the second load value between the reference block and the neighboring block increases.

13. The driving method of the display device of claim 9, wherein the generating the scale factor includes:

controlling the scale factor corresponding to the neighboring block to decrease as a difference in the second load value between the reference block and the neighboring block increases.

14. The driving method of the display device of claim 9, wherein the generating the scale factor includes:

controlling the scale factor corresponding to the neighboring block to decrease as the neighboring block is farther away from the reference block.

15. The driving method of the display device of claim 9, wherein when the first load value is greater than or equal to the reference load value, a luminance of an image displayed in the blocks decreases.

16. The driving method of the display device of claim 15, wherein the generating the scale factor includes:

controlling the scale factor corresponding to the blocks to decrease as the first load value increases.

* * * * *